US012687732B2

(12) United States Patent
Kanazawa et al.

(10) Patent No.: US 12,687,732 B2
(45) Date of Patent: Jul. 21, 2026

(54) MULTI-CHANNEL OPTICAL MODULE

(71) Applicant: NTT, Inc., Tokyo (JP)

(72) Inventors: Shigeru Kanazawa, Musashino (JP);
Yasuhiko Nakanishi, Musashino (JP);
Takahiko Shindo, Musashino (JP);
Meishin Chin, Musashino (JP)

(73) Assignee: NTT, Inc., Tokyo (JP)

( * ) Notice: Subject to any disclaimer, the term of this
patent is extended or adjusted under 35
U.S.C. 154(b) by 321 days.

(21) Appl. No.: 18/566,003

(22) PCT Filed: Jun. 23, 2021

(86) PCT No.: PCT/JP2021/023794
§ 371 (c)(1),
(2) Date: Nov. 30, 2023

(87) PCT Pub. No.: WO2022/269805
PCT Pub. Date: Dec. 29, 2022

(65) Prior Publication Data
US 2024/0248319 A1      Jul. 25, 2024

(51) Int. Cl.
*G02B 27/10*          (2006.01)
*H04J 14/00*          (2006.01)
*H04J 14/02*          (2006.01)

(52) U.S. Cl.
CPC ............ *G02B 27/108* (2013.01); *H04J 14/02*
(2013.01); *H04J 14/0305* (2023.08); *H04J
14/05* (2023.08)

(58) Field of Classification Search
CPC .... G02B 27/108; H04J 14/02; H04J 14/0305;
H04J 14/05
See application file for complete search history.

(56) References Cited

U.S. PATENT DOCUMENTS

2016/0277116 A1*   9/2016   Hasegawa ............ G02B 6/4296
2017/0034602 A1*   2/2017   Tanaka ................... H04B 10/58

FOREIGN PATENT DOCUMENTS

JP          2016-178218 A      10/2016
JP          2017-034310 A      2/2017

OTHER PUBLICATIONS

Ken Tsuzuki et al, *Full C-Band Tunable DFB Laser Array Copack-
aged with InP Mach-Zehnder Modulator for DWDM Optical Com-
munication Systems*, IEEE Journal of Selected Topics in Quantum
Electronics, vol. 15, No. 3, May/Jun. 2009, pp. 521-527.

(Continued)

*Primary Examiner* — Phu Vu
(74) *Attorney, Agent, or Firm* — Workman Nydegger

(57)          ABSTRACT

Crosstalk between adjacent channels is suppressed when
monitoring optical output power. A multi-channel optical
module for multiplexing and outputting a plurality of wave-
length channels, which includes a plurality of light sources
each having a different wavelength, a plurality of collimator
lenses coupled to the respective outputs of the plurality of
light sources, a beam splitter coupled to an output of each of
the plurality of collimator lenses, a plurality of monitor PDs
for monitoring optical power branched from the beam
splitter, and a plurality of wavelength filters inserted
between the beam splitter and each of the plurality of
monitor PDs and each wavelength filter transmitting only
the wavelength of the light source coupled by the beam
splitter.

1 Claim, 5 Drawing Sheets

(56) References Cited

OTHER PUBLICATIONS

Lewis B. Aronson et al., *Transmitter Optical Subassembly for XFP Applications*, 2005 Electronic Components and Technology Conference, 2005, pp. 1-7.

Tadashi Murao et al., *Integrated Spatial Optical System for Compact 28-Gb/s X 4-lane Transmitter Optical Subassemblies*, IEEE Photonics Technology Letters, vol. 26, No. 22, Nov. 15, 2014, pp. 2275-2278.

* cited by examiner

MULTI-CHANNEL OPTICAL MODULE

TECHNICAL FIELD

The present invention relates to a multi-channel optical module, and more particularly to a multi-channel module which is a role as an optical transmitter in an optical communication system using a wavelength multiplex optical transmission system.

BACKGROUND ART

Conventionally, with an increase in communication traffic, a wavelength multiplex optical transmission system has been used to increase the transmission capacity at an optical communication system. In order to perform wavelength multiplex optical transmission, a light source is prepared for each wavelength channel, and output light from the plurality of light sources is multiplexed by an optical multiplexer and output to an optical fiber. In the optical communication system, it is required to keep the optical intensity of an optical transmission signal constant, and in the wavelength multiplex optical transmission system, it is also necessary to keep the optical intensity of each wavelength channel constant. In view of this, a part of the optical transmission signal is branched to monitor the light intensity, and the light source is controlled so that the light intensity to be monitored becomes constant.

FIG. 1 shows an example of an optical transmitter for multiplexing four wavelengths which is a conventional multi-channel optical module. Output lights from light source chips 11a to 11d each of which is mounted on each wavelength channel are input to an optical multiplexer 20 through collimator lenses 31a to 31d and multiplexed. The output of the optical multiplexer 20 is multiplexed with all wavelength channels as wavelength multiplexed light through a condenser lens 32 and is coupled to an optical fiber 41.

FIG. 2 shows an example of a light source of the conventional multi-channel optical module. In the light source, a light source chip 11 including a modulation light source part 16 and an optical amplification part 15 is mounted on a subcarrier 12, and a monitor PD 13 for monitoring a part of output light from the modulation light source part 16 is mounted on a rear end of the light source chip 11. The monitor PD 13 detects the light output power of each wavelength channel as a current value, and a control circuit 14 adjusts a current supply amount to the light source chip 11 so that the detected current value becomes constant. By such an optical output control (APC) circuit, the optical output power from each light source chip 11 can be made constant at all times (see, for example, Non Patent Literatures 2 and 3).

Thus, the configuration in which the monitor PD 13 is arranged at the rear end of the light source chip 11 can monitor the light output power proportional to the output light from the light source chip 11. However, it is impossible to accurately monitor the optical output power for each wavelength channel when the wavelength multiplexed light is output.

FIG. 3 shows another example of a conventional multi-channel optical module. FIG. 3(a) shows a structure of the multiplexer viewed from a substrate plane, and FIG. 3(b) shows a structure of the multiplexer viewed from a substrate side. Output lights from light source chips 11a to 11d each of which is mounted on a light source for each wavelength channel are input to an optical multiplexer 20 through collimator lenses 31a to 31d and a beam splitter 51 and multiplexed. The output of the optical multiplexer 20 is multiplexed with all wavelength channels as a wavelength multiplexed light through a condenser lens 32 and is coupled to an optical fiber 41. (see, for example, Non Patent Literature 1).

The output lights from the light source chips 11a to 11d are partially branched by a beam splitter 51 and monitored by monitor PDs 53a to 54d. The outputs of the monitor PDs 53a to 53d are input to the control circuit 14 of the light source, and the current supply amount to the light source chip 11 is adjusted so that the detected current value becomes constant. Thus, the configuration in which the monitor PD 53 is arranged on the output side of the light source chip 11 can accurately monitor the output from the optical amplification part 15 of the light source, but the loss of light occurs by the passing loss of the beam splitter 51.

In addition, the spread of the output beam from the light source chip 11 is large, and as shown by a thin line in FIG. 3(a), a light component which becomes collimated light and is input to the multiplexer, and as shown by a dotted line, a stray light component which does not contribute to the collimated light are output. Thus, the stray light component exceeding the effective diameter of the collimator lens 31 is mixed into the monitor PD 13 of the adjacent channel, and there is a problem that crosstalk is generated.

CITATION LIST

Non Patent Literature

[NPL 1] K. Tsuzuki et. al., "Full C-Band Tunable DFB Laser Array Copackaged With InP Mach-Zehnder Modulator for DWDM Optical Communication Systems," Journal of selected topics in quantum electronics, vol. 15, No. 3, pp. 521-527, 2009
[NPL 2] L. B. Aronson et. al., "Transmitter Optical Subassembly for XFP Applications," ECTC2005, DOI: 10.1109ECTC.2005.1441402
[NPL 3] Tadashi Murao et al, "Integrated Spatial Optical System for Compact 28-Gb/s*4-lane Transmitter Optical Subassemblies", IEEE PHOTONICS TECHNOLOGY LETTERS, P. 2275 VOL. 26, No. 22, Nov. 15, 2014

SUMMARY OF INVENTION

An object of the present invention is to provide a multi-channel optical module that suppresses crosstalk between adjacent channels when monitoring optical output power.

In order to achieve such an object, one embodiment provides a multi-channel optical module for multiplexing and outputting a plurality of wavelength channels, which includes a plurality of light sources each having a different wavelength, a plurality of collimator lenses coupled to the respective outputs of the plurality of light sources, a beam splitter coupled to an output of each of the plurality of collimator lenses, a plurality of monitor PDs for monitoring optical power branched from the beam splitter, and a plurality of wavelength filters inserted between the beam splitter and each of the plurality of monitor PDs and each wavelength filter transmitting only the wavelength of the light source coupled by the beam splitter.

BRIEF DESCRIPTION OF DRAWINGS

FIG. 4 is a diagram showing a multi-channel optical module according to example 1 of the present invention.

FIG. 5 is a diagram showing a multi-channel optical module according to example 2 of the present invention.

DESCRIPTION OF EMBODIMENTS

Figure 1:
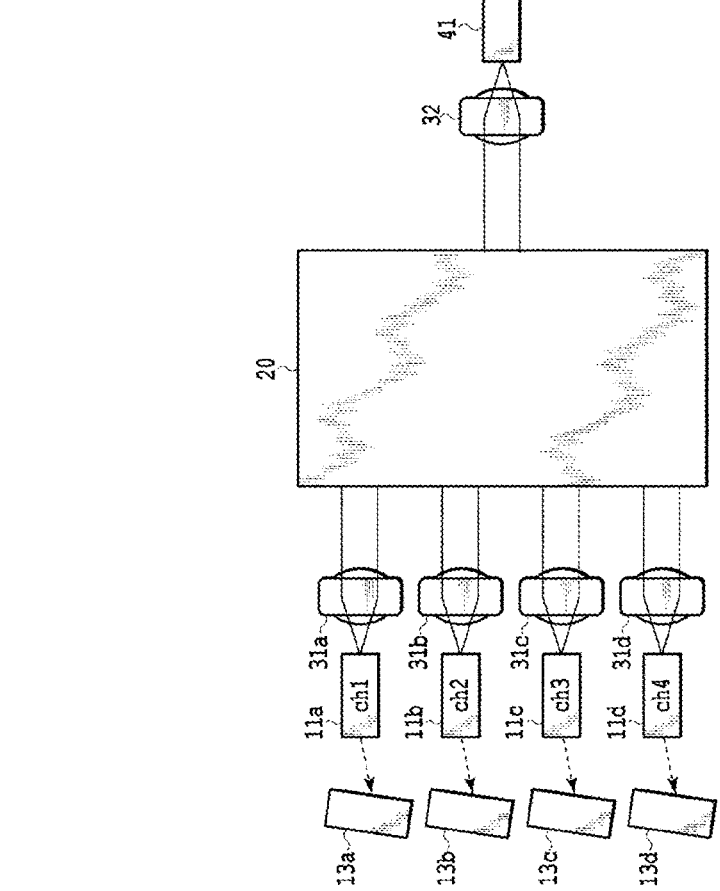
FIG. 1 is a diagram showing an example of a conventional multi-channel optical module.

Embodiments of the present invention will be described in detail below with reference to the drawings. In the present embodiment, the multi-channel optical module for multiplexing four wavelengths and outputting will be described, but the number of wavelengths to be multiplexed is not limited.

Example 1

Figure 4:
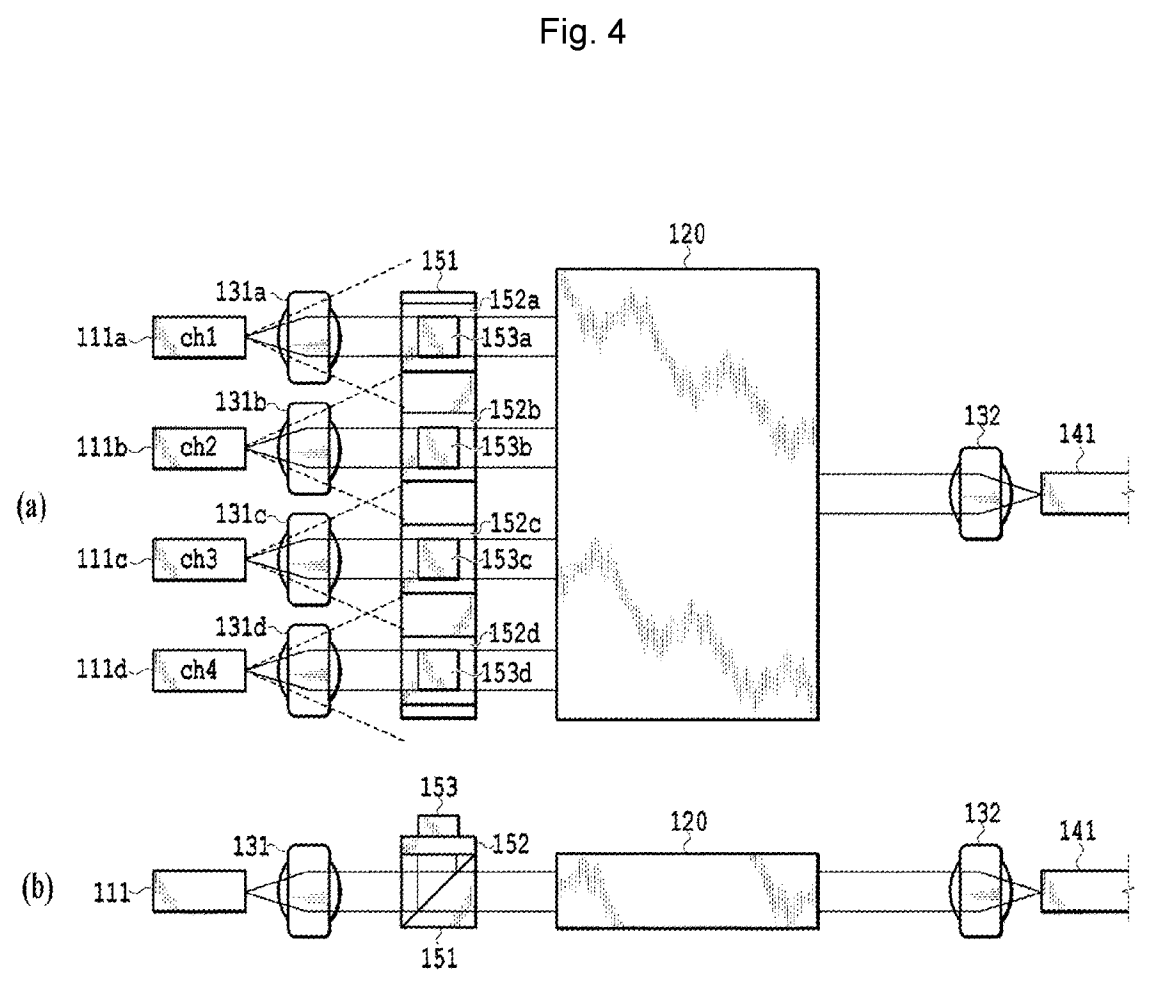

FIG. 4 shows an example of an optical transmitter which multiplexes four different wavelengths in the multi-channel optical module according to the example 1 of the present invention. FIG. 4(*a*) shows a structure of a multiplexer viewed from the substrate plane, and FIG. 4(*b*) shows a structure of the multiplexer viewed from the substrate side. Output lights from the light source chips 111*a* to 111*d* each of which is mounted on a light source for each wavelength channel are input to an optical multiplexer 120 through collimator lenses 131*a* to 131*d* and a beam splitter 151 and multiplexed. The output of the optical multiplexer 120 is multiplexed with all wavelength channels as a wavelength multiplexed light through a condenser lens 132 and is coupled to an optical fiber 141.

The output lights from the light source chips 111*a* to 111*d* are partially branched by the beam splitter 151, and an optical power of each output light is monitored by monitor PDs 153*a* to 153*d* through wavelength filters 152*a* to 152*d*. The outputs of the monitor PDs 153*a* to 153*d* are input to the control circuit of the light source, and current supply amount to the light source chip 111 is adjusted so that the detected current value becomes constant, that is, the optical power of each output light becomes constant.

The beam splitter 151 may be, for example, a cube type in which slopes of two right-angle prisms are coupled with each other with an optical thin film interposed there between. The example 1 has an integrated structure in which four channels can be branched collectively. Wavelength filters 152*a* to 152*d* consisting of optical thin films are inserted between the beam splitter 151 and each of the monitor PDs 153*a* to 153*d*. Each of the wavelength filters 152*a* to 152*d* is the optical filter transmitting only the wavelength of each of the light sources 111*a* to 111*d* coupled by the beam splitter 151, and transmits light of a specific wavelength region for each wavelength channel.

For example, the output light from the light source chip 111*a* passes through the collimator lens 131*a* to become collimated light as shown by a thin line in FIG. 4(*a*) and input to the optical multiplexer 120 through the beam splitter 151. On the other hand, as shown by a dotted line, a stray light component exceeding the effective diameter of the collimator lens 131*a* reaches an adjacent channel through the beam splitter 151. However, since this stray light component cannot pass through the wavelength filter 152*b* of the adjacent channel, and is not coupled to the monitor PD 153*b* of the adjacent channel. Therefore, crosstalk between adjacent channels when monitoring the optical output power can be suppressed.

After the multi-channel optical module of the example 1 was assembled as an optical transmitter, the output of the light source chip 111 of each wavelength channel was set to be +4 dBm, and the current value detected by the monitor PD 153 was measured when only single wavelength channel was operated. The current values of the wavelength channels 1 to 4 were 104, 101, 101, and 100 μA, respectively. Next, the current values detected by the monitor PD 153 were measured when the four channels were simultaneously operated, then 104, 101, 101, and 100 μA was obtained, respectively.

Figure 2:
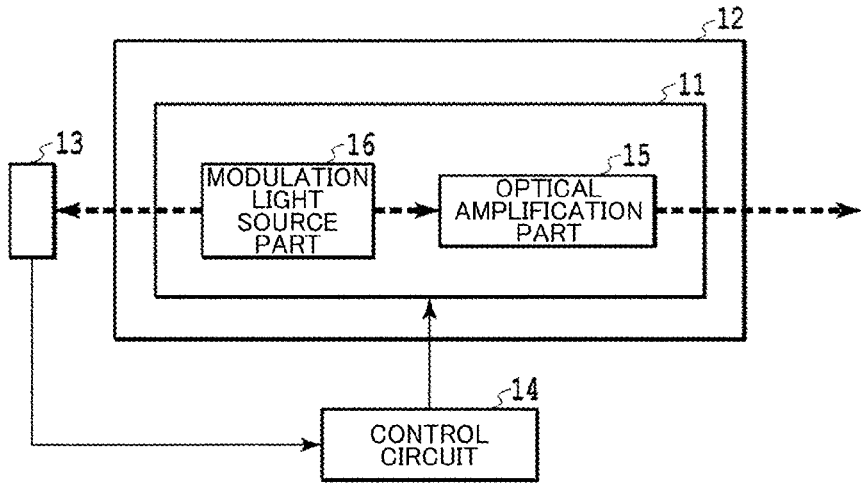
FIG. 2 is a diagram showing an example of a light source of the conventional multi-channel optical module.
Figure 3:
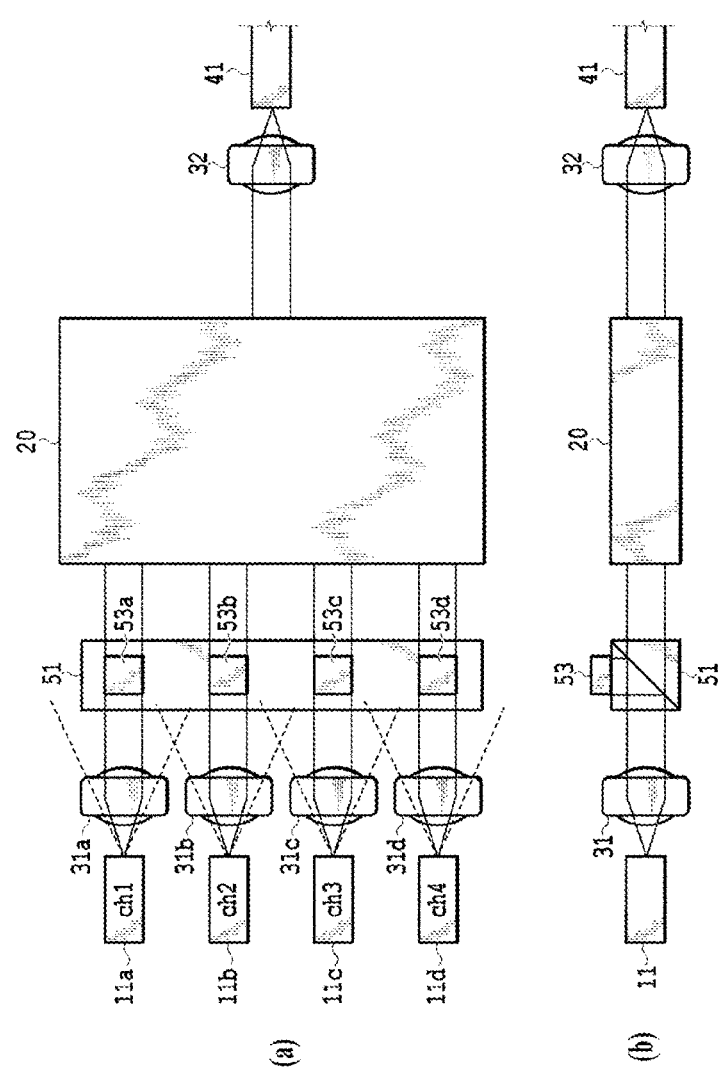
FIG. 3 is a diagram showing another example of the conventional multi-channel optical module.

For comparison, the same measurement was also performed in the conventional optical transmitter shown in FIG. 2. The output of the light source chip 11 of each wavelength channel was set to be +4 dBm, and the current value of the monitor PD 53 was 105, 103, 101, and 99 μA, respectively when only single wavelength channel was operated. Next, the current values detected by the monitor PD 53 were measured when the four channels were simultaneously operated, then 115, 113, 112, and 110 μA was obtained, respectively.

In the conventional example, it is understood that the current value is greater when four channels are simultaneously operated than when single wavelength channel is operated, which is affected by crosstalk. On the other hand, according to the example 1, it is understood that there is no change in the current value when the single wavelength channel is operated and when the four channels are simultaneously operated, and the crosstalk between adjacent channels is suppressed.

Example 2

Figure 5:
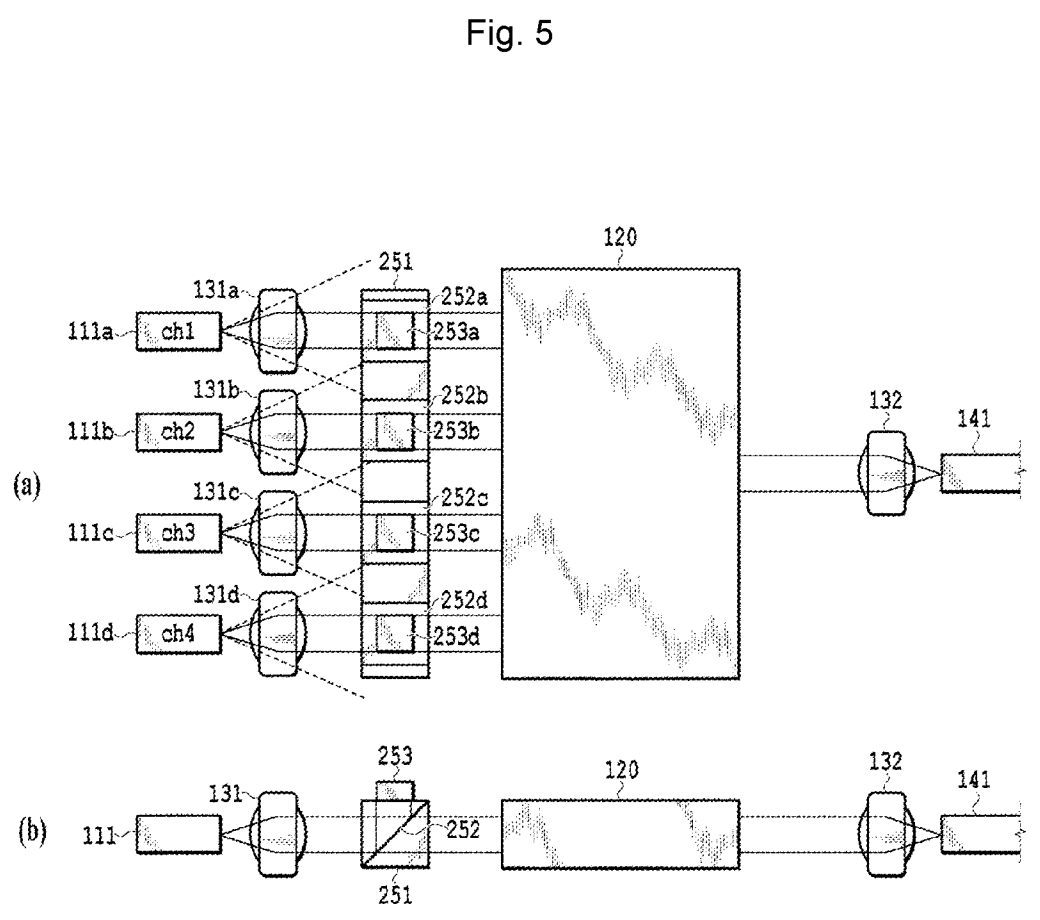

FIG. 5 shows an example of an optical transmitter which multiplexes four different wavelengths in the multi-channel optical module according to the example 2 of the present invention. FIG. 5(*a*) shows a structure of the multiplexer viewed from the substrate plane, and FIG. 5(*b*) shows a structure of the multiplexer viewed from the substrate side. Output lights from the light source chips 111*a* to 111*d* each of which is mounted on a light source for each wavelength channel are input to an optical multiplexer 120 through collimator lenses 131*a* to 131*d* and a beam splitter 251 and multiplexed. The output of the optical multiplexer 120 is multiplexed with all wavelength channels as a wavelength multiplexed light through a condenser lens 132 and is coupled to an optical fiber 141.

The output lights from the light source chips 111*a* to 111*d* are partially branched by beam splitter 251, and the optical power of each output light is monitored by monitor PDs 253*a* to 253*d*. The outputs of the monitor PDs 253*a* to 253*d* are input to the control circuit of the light source, and current supply amount to the light source chip 111 is adjusted so that the detected current value becomes constant, that is, the optical power of each output light becomes constant.

The beam splitter 251 may be, for example, a cube type in which slopes of two right-angle prisms are coupled with each other with an optical thin film interposed there between. The difference from the beam splitter 151 of the example 1 is that an optical thin film 252 formed on a slope is designed to branch only the wavelength for each of the light sources 111*a* to 111*d* respectively coupled through the collimator lenses 131*a* to 131*d*. That is, the two right-angle prisms have a four-channel integrated structure, but a different optical thin film 252 is formed for each wavelength channel. As in the example 1, the stray light component from the light source chip 111*a* is not branched in the optical thin film 252 of the adjacent channel, so that the stray light component is not coupled to the monitor PD 253*b* of the adjacent channel. Therefore, crosstalk between adjacent channels when monitoring the optical output power can be suppressed.

After the multi-channel optical module of the example 2 was assembled as an optical transmitter, the output of the light source chip 111 of each wavelength channel was set to be +5 dBm, and the current value detected by the monitor PD 253 was measured when only single wavelength channel was operated. The current values of the wavelength channels 1 to 4 were 124, 121, 121, and 121 μA, respectively. Next, the current values detected by the monitor PD 253 were measured when the four channels were simultaneously operated, then 124, 122, 122, and 121 μA was obtained, respectively.

For comparison, the same measurement was also performed in the conventional optical transmitter shown in FIG. 2. The output of the light source chip 11 of each wavelength channel was set to be +5 dBm, and the current value of the monitor PD 53 was 125, 123, 121, and 119 μA, respectively when only single wavelength channel was operated. Next, the current values detected by the monitor PD 53 were measured when the four channels were simultaneously operated, then 136, 133, 132, and 130 μA was obtained, respectively.

In the conventional example, it is understood that the current value is greater when four channels are simultaneously operated than when single wavelength channel is operated, which is affected by the crosstalk. On the other hand, according to the example 2, it is understood that there is no change in the current value when the single wavelength channel is operated and when the four channels are simultaneously operated, and the crosstalk between adjacent channels is suppressed.

The invention claimed is:

1. A multi-channel optical module for multiplexing and outputting a plurality of wavelength channels, comprising:

a plurality of light sources each having a different wavelength;

a plurality of collimator lenses coupled to the respective outputs of the plurality of light sources;

a beam splitter coupled to an output of each of the plurality of collimator lenses and including a plurality of optical thin films each branching only the wavelength of the light source coupled through each collimator lens; and a plurality of monitor PDs for monitoring optical power branched from the beam splitter.

* * * * *